United States Patent
Burkhard et al.

(10) Patent No.: US 8,581,121 B2
(45) Date of Patent: Nov. 12, 2013

(54) FORCE-TRANSMITTING DEVICE WITH A CALIBRATION WEIGHT THAT CAN BE COUPLED AND UNCOUPLED

(75) Inventors: Hans-Rudolf Burkhard, Wila (CH); Ferdinand Schneider, Winterthur (CH); Dominique Genoud, Olten (CH)

(73) Assignee: Mettler-Toledo AG, Greifensee (CH)

( * ) Notice: Subject to any disclaimer, the term of this patent is extended or adjusted under 35 U.S.C. 154(b) by 489 days.

(21) Appl. No.: 12/970,307

(22) Filed: Dec. 16, 2010

(65) Prior Publication Data
US 2011/0147099 A1    Jun. 23, 2011

(30) Foreign Application Priority Data
Dec. 21, 2009  (EP) .................................... 09180142

(51) Int. Cl.
*G01G 1/38*    (2006.01)
*G01G 23/01*   (2006.01)
*G01G 21/00*   (2006.01)

(52) U.S. Cl.
USPC ........ 177/50; 177/210 EM; 177/212; 73/1.13

(58) Field of Classification Search
USPC .............. 177/50, 212, 210 EM; 73/1.13, 1.15
See application file for complete search history.

(56) References Cited

U.S. PATENT DOCUMENTS

| 4,343,373 | A | * | 8/1982 | Stadler et al. ................... 177/50 |
| 5,646,376 | A | * | 7/1997 | Kroll et al. ..................... 177/211 |
| 5,844,174 | A | * | 12/1998 | Kuhlmann et al. ............. 177/50 |
| 6,194,672 | B1 | | 2/2001 | Burkhard et al. |
| 6,552,280 | B1 | * | 4/2003 | Tellenbach ....................... 177/264 |
| 7,478,551 | B2 | * | 1/2009 | Tellenbach et al. ............ 73/1.13 |
| 2008/0218303 | A1 | | 9/2008 | Baltisberger et al. |
| 2012/0312069 | A1 | * | 12/2012 | Burkhard et al. .............. 73/1.13 |

FOREIGN PATENT DOCUMENTS

| CH | 661121 A5 | 6/1987 |
| DE | 10024017 A1 | 7/2001 |
| JP | 3761792 B2 | 1/2006 |

* cited by examiner

Primary Examiner — Randy W Gibson
(74) Attorney, Agent, or Firm — Standley Law Group LLP

(57) ABSTRACT

The disclosed embodiments describe force-transmitting devices for use in gravimetric measuring instruments. The force-transmitting devices scale the force from a calibration weight to facilitate calibration and weighing. The devices comprise unidirectional coupling elements. The unidirectional coupling element comprises coupling element parts. The elements may be adapted to transmit only a tensile force or only a compressive force to a measurement transducer. Adapting the unidirectional coupling element to transmit one type of force or the other may be done by selecting an appropriate arrangement of coupling element parts. The coupling element parts are adapted to transmit force along a midline axis by either a projection and v-shaped groove coupling or projections on the first part mated with surfaces on the second part adapted to receive and guide the first part.

19 Claims, 7 Drawing Sheets

FORCE-TRANSMITTING DEVICE WITH A CALIBRATION WEIGHT THAT CAN BE COUPLED AND UNCOUPLED

CROSS-REFERENCE TO RELATED APPLICATIONS

This application is entitled to, and claims, benefit of a right of priority under 35 USC §119 from European patent application 09180142.3 filed on 21 Dec. 2009, the content of which is hereby incorporated by reference as if fully recited herein.

TECHNICAL FIELD

The disclosed embodiments are generally in the field of gravimetric measuring instruments and more particularly gravimetric measuring devices with force-transmitting devices.

BACKGROUND

Conventional gravimetric weighing instruments include weighing cells based on a variety of different operating principles such as for example weighing cells with strain gauges, weighing cells with string oscillators, or electromagnetic force-compensation (EMFC) weighing cells. Gravimetric measuring instruments with string oscillator weighing cells or electromagnetic force-compensation weighing cells deliver measurement results with a very high resolution.

In EMFC weighing cells, the weight of the load is transmitted—either directly or through one or more force-transmitting levers—to a measurement transducer which produces an electrical signal corresponding to the weighing load. By means of a weighing-oriented electronic module, the electrical signal is further processed and displayed on an indicator.

The mechanical design arrangement of weighing cells with string oscillators is largely analogous to EMFC weighing cells, with the difference that an oscillating string transducer is used instead of an electromagnetic measurement transducer. The load translates into an amount of tension of the oscillating string. The resultant frequency change of the string's oscillation, in turn, represents a measure for the load placed on the weighing pan. At the point in time when the measurement value is being captured, the mechanical system of an EMFC weighing cell is in a state of equilibrium similar to a mechanical beam balance with counterweights. In contrast, the load-receiving part of a string oscillator weighing cell undergoes a small vertical displacement in relation to the stationary part, as the string is set under tension by the load, whereby its length is slightly increased. String oscillator weighing cells are therefore also referred to as small-displacement force-measuring cells.

Both types of weighing cells are used for example in precision balances and analytical balances in the milligram range or in microbalances in the microgram range and need to be periodically recalibrated in order to ensure that the measurement values delivered by them lie within a prescribed tolerance range in accordance with the manufacturer's specifications and legal requirements. These periodic calibrations serve to compensate for the influence of factors that affect the weighing cell, for example changes of the ambient temperature or barometric pressure.

The calibration is made by periodically setting a load of known weight on the load-receiving part. Based on the difference between the weight value that was established in the final test prior to delivery of the weighing cell and the currently measured value, a correction value can be calculated by means of which the subsequent measurement results of the weighing cell can be corrected. In order to obtain the most accurate calibration value possible, the calibration weight should equal the maximum capacity load of the weighing cell. This can mean that very large calibration weights will be necessary.

Among the prior art, a variety of different gravimetric measuring instruments are known which include a built-in calibration weight.

A gravimetric measuring instrument of this kind which is based on the principle of electromagnetic force compensation and has a built-in rod-shaped calibration weight is disclosed in EP 0 955 530 B1. The rod-shaped calibration weight is set on a calibration weight carrier arm which is coupled to the load-receiving part and serves as a ratio lever. Due to this lever advantage, the mass of the calibration weight, and thus its dimensions, can be kept small. As the calibration weight arm is always coupled to the load-receiving part, it serves only for the purposes of receiving and leveraging the calibration weight during the calibration process, but is not part of the calibration weight itself. Consequently, the calibration weight carrier arm is part of a force-transmitting device, more specifically of a lever mechanism for transmitting and reducing the force before it reaches the measurement transducer, and remains permanently connected to the load-receiving part also while the balance operates in normal weighing mode.

As disclosed in CH 661 121 A5, the force-transmitting device can also include a multi-stage lever mechanism, wherein the individual levers are suitably connected to each other by means of coupling elements, so that a force reduction is achieved between the load-receiving part and the measurement transducer. Formed on one of the coupling elements are suitably designed receiving elements on which to set a calibration weight.

In JP 3761792 B2 a weighing cell equipped with strain gauges is disclosed which has a calibration weight with a ratio lever. A coupling element is arranged between the ratio lever and the load-receiving part. By raising the calibration weight and the coupling element, a bearing block which is formed on the coupling element is separated from a knife edge pivot which arranged on the load-receiving part, whereby the ratio lever is uncoupled from the load-receiving part.

All of the foregoing conventional solutions are equipped with calibration-weight-loading devices that are familiar to professionals in the weighing equipment field.

The precise determination of the correction value depends not only on the resolution capabilities of the measurement transducer but also to a substantial degree on the level of precision at which the geometric relationships are maintained. Even the smallest deviations in the seating position of the calibration weight from its specified position on the calibration weight carrier arm described in EP 0 955 530 B1, or on the coupling member described in CH 661 121 A5, or the smallest shifts in the position of the bearing block relative to the knife edge pivot in JP 3761792 B2, will cause a lengthening or shortening of the effective lever arm and thus to an error in the correction value. Consequently, the points of contact between the calibration weight and the calibration weight carrier arm, or between the knife edge pivot and the bearing block, are finished with the highest precision at a correspondingly high cost.

SUMMARY

The disclosed embodiments concern a force-transmitting device for a gravimetric measuring instrument, wherein the force-transmitting device has a load-receiving part and a stationary part. A weighing pan which is connected to the load-receiving part receives the load that is to be weighed. The force which the load exerts on the weighing pan is transmitted—either directly or by means of a force-reducing lever mechanism—to a measurement transducer. Together with a parallelogram-type guiding arrangement serving to guide the weighing pan and the load-receiving part in vertical movement, the force-transmitting device and the measurement transducer substantially constitute a weighing cell of a gravimetric measuring instrument.

An object of the disclosed embodiments is to create a force-transmitting device for a gravimetric measuring instrument with a measurement transducer, wherein a calibration weight can be brought into operating contact with the force-transmitting device in a way that minimizes the degree to which the calibration weight force acting on the measurement transducer is influenced by shifts in the geometry.

A force-transmitting device of a gravimetric measuring instrument has a stationary part and a load-receiving part. The load-receiving part is force-transmitting linked either directly or by way of at least one coupling element and at least one lever to a measurement transducer which is arranged on the stationary part. The force-transmitting device according to the disclosed embodiments further includes a calibration lever whose fulcrum is based on the stationary part. The calibration lever includes a first and a second calibration lever arm, wherein the first calibration lever arm is solidly connected to a calibration weight, while the second calibration lever arm is connected by way of a unidirectional coupling element to the load-receiving part, or to the at least one coupling element, or to a lever arm of the at least one lever. The unidirectional coupling element is divided in two, i.e. into a first coupling element part and a second coupling element part. The first coupling element part is connected through a first flexure pivot to a fixed place on the load-receiving part or on the coupling element or on the lever arm, while the second coupling element part is connected through a second flexure pivot to a fixed place on the second calibration arm. The flexure pivots of both coupling element parts are designed to have the greatest possible flexibility, so as to minimize bending moments generated by pivoting movements, but to still be able to perform their generic function of transmitting tensile or compressive forces in the direction of their central longitudinal axis. Furthermore, an unstable bending tendency of the flexure pivots must not be allowed to be so strong that the coupling element parts could be deflected by the force of gravity or by inertial and acceleration forces during operation of the force-transmitting device.

The coupling element parts are aligned to each other in such a way that, due to the unidirectional coupling element being divided into two parts, the force that can be transmitted from the second flexure pivot to the first flexure pivot is either exclusively a tensile force or exclusively a compressive force. This concept allows the calibration lever with the solidly connected calibration weight to be force-transmitting linked to the load-receiving part, to a coupling element, or to a lever arm of the force-transmitting device, or to completely unlink the calibration weight force. The steps of linking or unlinking can be performed by means of the previously mentioned calibration-weight-loading device by raising or lowering the calibration weight. The feature of a "unidirectional coupling element" in the sense of the disclosed embodiments thus implies that due its special design, the linking allows either only a compressive force or only a tensile force to be transmitted in a defined direction along its central longitudinal axis. Under a load in the opposite direction, the coupling element parts separate themselves from each other, so that no force transmission can take place between them. Depending on the actual configuration of the coupling element parts, this separation can also be in effect only for a specific range of displacement of the first coupling element part relative to the second coupling element part, in which case only this specific range of displacement is to be considered as separation in the sense of the disclosed embodiments.

In contrast to conventional devices, the transmission of the force is not directed through the seating contacts of the calibration weight but through the unidirectional coupling element or, more specifically, through its flexure pivots. Consequently, the geometrical relationships always remain unchanged, because minute shifts in position between the first and the second coupling element parts are evened out and are not taking place in the actual points where the force is introduced, which are defined by the unchangeable locations of the flexure pivots. As the gathering of measurement results in weighing cells with electromagnetic force compensation takes place in a balanced state of the system, the bending moments in the pivots of the force-transmitting device are approximately equal to zero. The calibration lever, more specifically its fulcrum pivot, is preferably designed accordingly, so that the lever fulcrum is free of bending moments during the calibration process. With good approximation, the foregoing comments also apply to string oscillator weighing cells, because a load placed on the load-receiving part causes only a minute amount of stretching of the string, and the bending moments occurring as a result in the flexure pivots of the force-transmitting device are therefore very small.

The respective central longitudinal axes of the first and the second flexure pivot preferably coincide with each other, so that no destabilizing moments occur within the unidirectional coupling element. However, a small parallel offset of the two central longitudinal axes can be allowed if the design of the at least one contact area between the first coupling element part and the second coupling element part provides an intrinsic stability to keep the two coupling element parts from deflecting sideways. This stability is inherently present in the transmission of tensile forces, while in the case of compressive forces only certain design configurations will lend an intrinsic stability to the unidirectional coupling element.

In a first embodiment, the second coupling element part has, as a means for the transmission of compressive forces, a surface which faces towards the first coupling element part, with two projections that protrude from the surface and are arranged mirror-symmetrically relative to the central longitudinal axis of the second flexure pivot. Further, the first coupling element part has at least one receiving surface which faces towards the second coupling element part and against which the two projections can seat themselves. With this configuration, two contact points which are arranged in a plane that extends orthogonal to the central longitudinal axes of the two flexure pivots are lending an intrinsic stability to the unidirectional coupling element, enabling the latter to transmit a compressive force.

As a means for centering the first coupling element part and the second coupling element part relative to each other during the calibration process and to prevent them from shifting their mutual positions orthogonal to the central longitudinal axes of the flexure pivots, there can be two receiving surfaces for the projections slanted against each other at a shallow angle. However, the slope angle of the receiving surfaces is subject to certain limits due to the requirement for intrinsic stability of the unidirectional coupling element.

The limits for the slope angle of the receiving surfaces depend on the geometric proportions of the unidirectional coupling element, wherein the angle α between a receiving surface and the central longitudinal axis of the flexure pivot has to satisfy the following condition:

$$90° \geq \alpha \geq \arccos(b/s),$$

wherein b stands for the perpendicular distance of a contact point from the central longitudinal axis of the flexure pivot and s stands for the distance of a contact point from the bending axis of the flexure pivot. According to the foregoing definition of the angle α, intrinsic stability is attained if the lines of action of the forces transmitted at the contact points are not intersecting within the confines of the coupling element part.

In a configuration that is suitable for the transmission of tensile forces, the first coupling element part can have a first traction element with a projection, and the second coupling element part can have a second traction element with a V-shaped bearing, wherein the first coupling element part and the second coupling element part are hooked into each other, the projection is aligned with the V-bearing, and when tensile forces are being transmitted, the projection is in force-transmitting contact with the V-bearing.

In another embodiment, the first coupling element part and the second coupling element part can be connected to each other by means of a flexible hinge. Although the two coupling element parts in this embodiment are physically connected to each other, the coupling element is nevertheless divided into two parts, consistent with the disclosed embodiments. The opening direction of the flexible hinge is arranged in accordance with the central longitudinal axis of the first and second flexure pivots. For the transmission of tensile or compressive forces, a projection is formed on the first coupling element part and a contact surface, oriented to cooperate with the projection, is formed on the second coupling element part.

The force-transmitting device can also include a parallel-guiding arrangement, so that in the operating mode of the device, the load-receiving part is guided in vertical movement by being linked to the stationary part by means of at least one upper parallel guide and at least one lower parallel guide.

The force-transmitting device can be composed of different individual components which are joined together by means of connecting elements to form a unit. Two or more of these elements can also be joined through a materially integral connection. Preferred are design configurations where at least the load-receiving part, the stationary part, the calibration lever and the unidirectional coupling element are monolithically connected to each other.

As mentioned hereinabove, the force-transmitting device according to the disclosed embodiments can be used in combination with a measurement transducer and a calibration weight as a weighing cell in a gravimetric measuring instrument. A gravimetric measuring instrument is normally calibrated in such a way that the weight force produced by the calibration weight is transmitted to the measurement transducer by way of the load-transmitting device in the same direction as a force acting on the load-receiving part. Consequently, the load resulting from a calibration force is introduced into the measurement transducer in the same way as a normal load is introduced in the normal operating mode of the device. In string oscillator weighing cells, the measuring force can in most cases only be applied in the direction of the load. The foregoing embodiment is therefore suitable for weighing cells of the string oscillator type as well as the EMFC type.

As another possibility, the weight force of the calibration weight can also be applied by the force-transmitting device to the measurement transducer in the opposite direction compared to a force acting on the load-receiving part. This concept is particularly suitable for EMFC weighing cells which have a measurement transducer with push/pull action as described in detail in US 20080218303 A1. Due to this design of the measurement transducer the calibration weight can be used as a compensation weight to expand the load range of the weighing cell. In the uncoupled condition of the calibration weight, a weighing cell of this type could for example weigh loads in the range of 0 to 100 grams, and by engaging the calibration weight it could switch to an extended load range and weigh loads from 100 to 200 grams, as the weight force of the calibration weight acts against the force of the load on the load-receiving part.

The calibration weight is normally made of a corrosion-proof material with a uniform density of $\rho=8.0$ kg/dm³. However, the calibration weight can also be made in part of the same material as the force-transmitting device and combined with a supplemental mass of higher density. In order to improve the accuracy of the calibration value, there can be a pressure sensor serving to measure the ambient barometric pressure of the gravimetric measuring instrument. The measurement value produced by the pressure sensor can be used to calculate a buoyancy correction for the calibration weight, as the buoyant force of the air displaced by the calibration weight counteracts the weight force of the calibration weight.

BRIEF DESCRIPTION OF THE DRAWINGS

Different design variations embodying the force-transmitting device according to the disclosed embodiments as well as their application in a gravimetric measuring instrument will hereinafter be described in more detail with the help of the drawings, wherein elements that are the same from one drawing to another are identified by the same reference symbols, and wherein.

DETAILED DESCRIPTION

Figure 1:
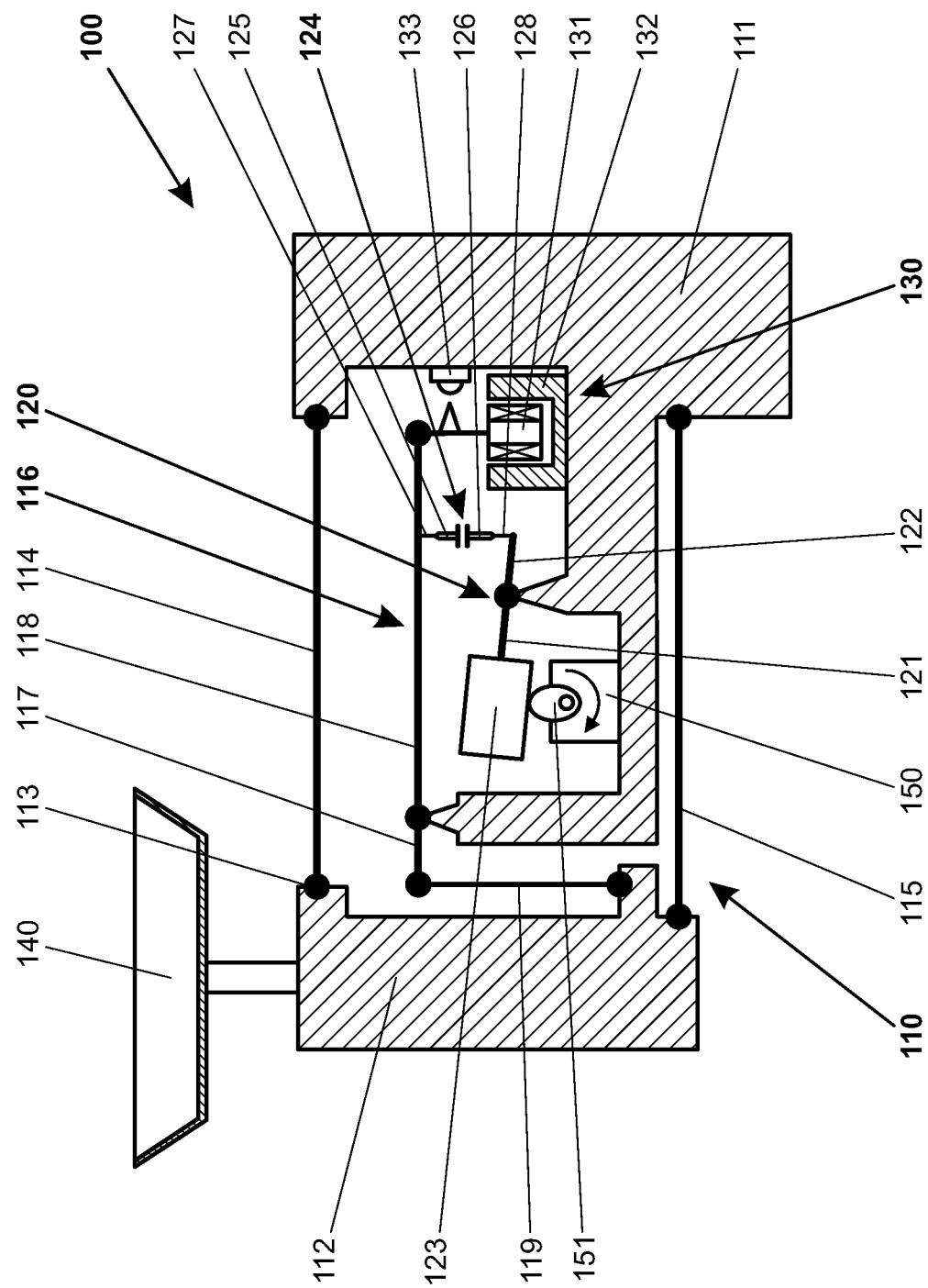
FIG. 1 shows a cross-section representation of a weighing cell with a first embodiment of a force-transmitting device in side view, with a lever mechanism arranged between the load-receiving part and the measurement transducer for the reduction of the force acting on the load-receiving part, wherein a unidirectional coupling element capable of transmitting only compressive forces is arranged between the lever mechanism and the calibration lever.

FIG. 1 shows a schematic representation of a weighing cell 100 with a first embodiment of a force-transmitting device 110. The force-transmitting device 110 has a stationary part 111 and a load-receiving part 112. The load-receiving part 112 is guided in parallel movement by being linked to the stationary part 111 through a first parallel guide 114 and a second parallel guide 115. All of the pivotal connections 113 of the force-transmitting device 110 are symbolized in the drawing by solid black circles and can be realized with any of the designs known in the art. These pivotal connections 113 may be designed as flexure pivots of the kind shown in FIGS. 5 to 7.

Connected to the load-receiving part 112 is a load receiver 140 in the form of a weighing pan. Further, a measurement transducer 130 capable of producing a force-dependent weighing signal is rigidly mounted on the stationary part 111. The measurement transducer 130 shown in the drawing has a coil 131 and a magnet 132 as well as a position sensor 133. The magnet 132 is solidly connected to the stationary part 111. The force that is to be measured is acting on the coil 131, which is arranged inside the magnet 132 in such a way that the coil 131 does not touch the magnet 132. The force acting on the coil 131 causes the latter to shift its position relative to the magnet 132, and this change in position is detected by the position sensor 133. The signal produced by the position sensor 133 is sent to an electronic system (not illustrated here) of the balance, which continuously regulates a current flowing through the coil 131, so as to restore the original position of the coil 131 relative to the magnet 132 against the action of the force. The current flowing through the coil 131 is measured, and the raw measurement signals are processed in the electronic system into a measurement value which, in turn, is passed on to a display unit (likewise not shown in the drawing) where the measurement value is presented in a visual format. Of course, instead of the measurement transducer 130 shown here one could also use other kinds of transducers, for example string oscillators, inductive or capacitive transducers, strain gauge transducers and the like.

Since the measurement transducer 130 shown in the drawing can only produce a compensation force of limited magnitude for the compensation of the force acting on the load-receiving part 140, a lever mechanism with one or more levers is often used for the reduction of the force that is to be measured. This lever mechanism is arranged as a force-transmitting conduit between the load-receiving part 112 and the measurement transducer 130. The lever mechanism shown in the drawing has a lever 116 which is pivotally supported on the stationary part 111 and whose short lever arm 117 is connected by way of a first coupling element 119 to the load-receiving part 112. The long lever arm 118 of the lever 116 is connected to the coil 131.

The force-transmitting device 110 further includes a calibration lever 120 which is likewise pivotally supported on the stationary part 111 and whose first calibration lever arm 121 is rigidly connected to a calibration weight 123. The function of transmitting the weight force of the calibration weight 123 is performed by a unidirectional coupling element 124 whose first coupling element part 125 is connected to the long lever arm 118 by way of a first flexure pivot 127 and whose second coupling element part 126 is connected to the second calibration lever arm 122 by way of a second flexure pivot 128. The first and second flexure pivots 127, 128 stand as conceptual representations for any possible kind of pivotal connections that have a certain amount of intrinsic stiffness or whose pivoting angle is limited. These properties of the pivotal connections, specifically the flexure pivots 127, 128, is absolutely essential at least for the upstanding pivot, in this case the flexure pivot 128, so that the two coupling element parts 125, 126 remain aligned with each other in their uncoupled state and will not deflect sideways under the force of gravity.

As shown in FIG. 1, a calibration-weight-loading device 150 is mounted on the stationary part. Depending on the position of the cam disk 151, the calibration-weight-loading device 150 either keeps the calibration weight 123 supported on the stationary part 111 or sets the calibration weight 123 free from its support. While the calibration weight 123 is in the supported state the two coupling element parts 125, 126 are separated from each other, while in the released state the two coupling element parts 125, 126 are in force-transmitting contact with each other, whereby the weight force of the calibration weight 123 is transmitted to the lever 118 and thus to the coil 131 of the measurement transducer 130. As is clear from the Figure, the unidirectional coupling element 124 as illustrated here allows only compressive forces to be transmitted, because when the calibration weight 123 is in the released state the second coupling element part 126 is pushed against the first coupling element part 125, acting against the reactive force that is generated by the measurement transducer 130.

Figure 2:
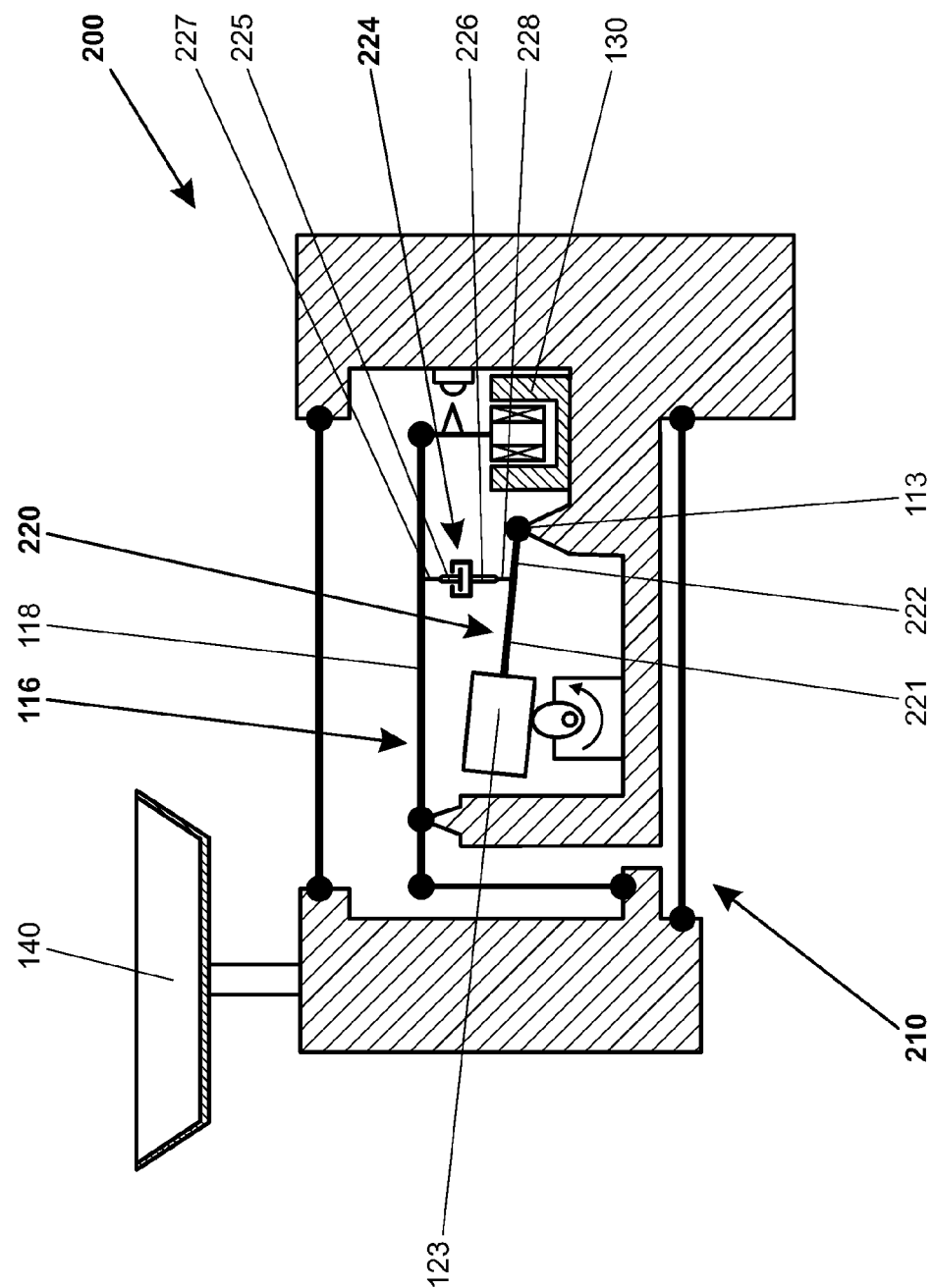
FIG. 2 shows a cross-section representation of a weighing cell with a second embodiment of the force-transmitting device in side view, with a lever mechanism arranged between the load-receiving part and the measurement transducer for the reduction of the force acting on the load-receiving part, wherein a unidirectional coupling element is capable of transmitting only tensile forces is arranged between the lever mechanism and the calibration lever.

FIG. 2 shows a side view of a cross-section of a weighing cell 200 with a second embodiment of a force-transmitting device 210. With the exception of the calibration lever 220 and the unidirectional coupling element 224, all of the elements illustrated in FIG. 2 are analogous to those of FIG. 1 and will therefore not be described again in the following.

The calibration lever 220 shown in FIG. 2 has likewise a first calibration lever arm 221 and a second calibration lever arm 222. The first calibration lever arm 221 extends from the lever fulcrum 113 to the calibration weight 123, and the second calibration lever arm 222 extends between the lever fulcrum 113 and the second flexure pivot 228 of the unidirectional coupling element 224.

The unidirectional coupling element 224 has a first coupling element part 225 and a second coupling element part 226 which, when not transmitting force from either the calibration weight or the load-receiving part, embrace each other loosely without physical contact. As soon as the calibration weight 123 is freed of its support and, as a result, a tensile force needs to be transmitted from the second flexure pivot 228 to the first flexure pivot 227 and thus to the long lever arm 118 of the lever 116, the second coupling element part 226 moves into force-transmitting engagement with the first coupling element part 225 after a relatively short displacement of the two parts along a displacement path defined by the flexure pivots 227, 228.

It should also be noted that the tensile force generated by the calibration weight 123 and transmitted to the long lever arm 118 acts in opposition to the force that is to be measured, which is generated by a load placed on the load receiver 140. Consequently, the calibration weight 123 can also be used for the purpose of expanding the weighing range of the weighing cell 200. The weighing range can be as much as doubled, if the effective force acting on the measurement transducer 130 due to the calibration weight 123 corresponds to the maximum amount of force that the transducer 130 is capable of measuring. The weighing range is now subdivided into two parts, although this is invisible to the user, with a first part of the range where no force from the calibration weight 123 is acting on the measurement transducer 130, and a second part of the range where the calibration weight 123 is coupled to the lever mechanism.

It is possible that releasing the calibration weight 123 from the supported state may slightly influence the measurement values, specifically the added effect of the pivot 113 of the calibration lever 220 which is thereby brought into play. To address this issue, one could select a coarser resolution or specify a lower accuracy class for the higher part of the measurement range. All of the operations that have just been described can be controlled by the electronic part of the balance responding automatically to the amount of the weighing load, so that the user need not be concerned about deciding which part of the weighing range to select.

Figure 3:
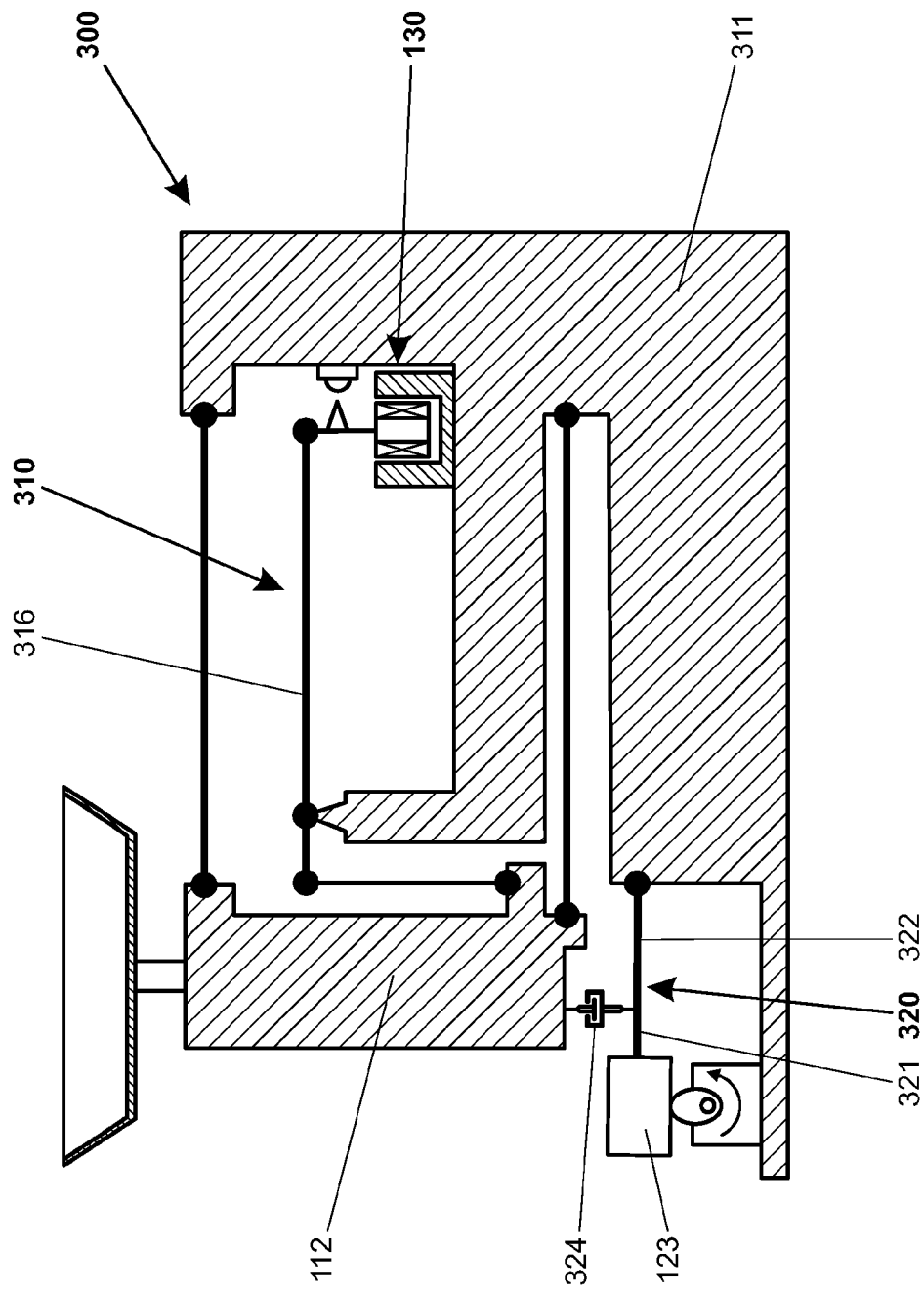
FIG. 3 shows a cross-section representation of a weighing cell with a third embodiment of the force-transmitting device in side view, with a lever mechanism arranged between the load-receiving part and the measurement transducer for the reduction of the force acting on the load-receiving part, wherein a unidirectional coupling element capable of transmitting only tensile forces is arranged between the load-receiving part and the calibration lever.

As is illustrated in FIG. 3, arrangements are possible where the calibration weight 123 acts more directly on the load-receiving part 112. FIG. 3 shows a weighing cell 300 in a third embodiment of the force-transmitting device 310. With the exception of the calibration lever 320 and the unidirectional coupling element 324, all of the elements shown in this drawing are analogous to FIG. 1 and will therefore not be described again in the following.

The lever mechanism has a lever 316 which is arranged between the load-receiving part 112 and the measurement transducer 130. The calibration lever 320 with a calibration weight 123 is pivotally connected to the stationary part 311 and, in relation to the operating position of the weighing cell 300, arranged below the load-receiving part 112. The transmission of the force from the calibration lever 320 to the load-receiving part 112 takes place by way of the unidirectional coupling element 324 which is designed for the transmission of tensile forces. In this embodiment, the calibration force that is transmitted to the load-receiving part 112 through the unidirectional coupling element is related to the lengths of the first lever arm 321 and the second lever arm 322 relative to each other. Specifically, the longer the second lever arm 322 is in relation to the first lever arm 321, the larger the calibration force that will be transmitted.

Figure 4:
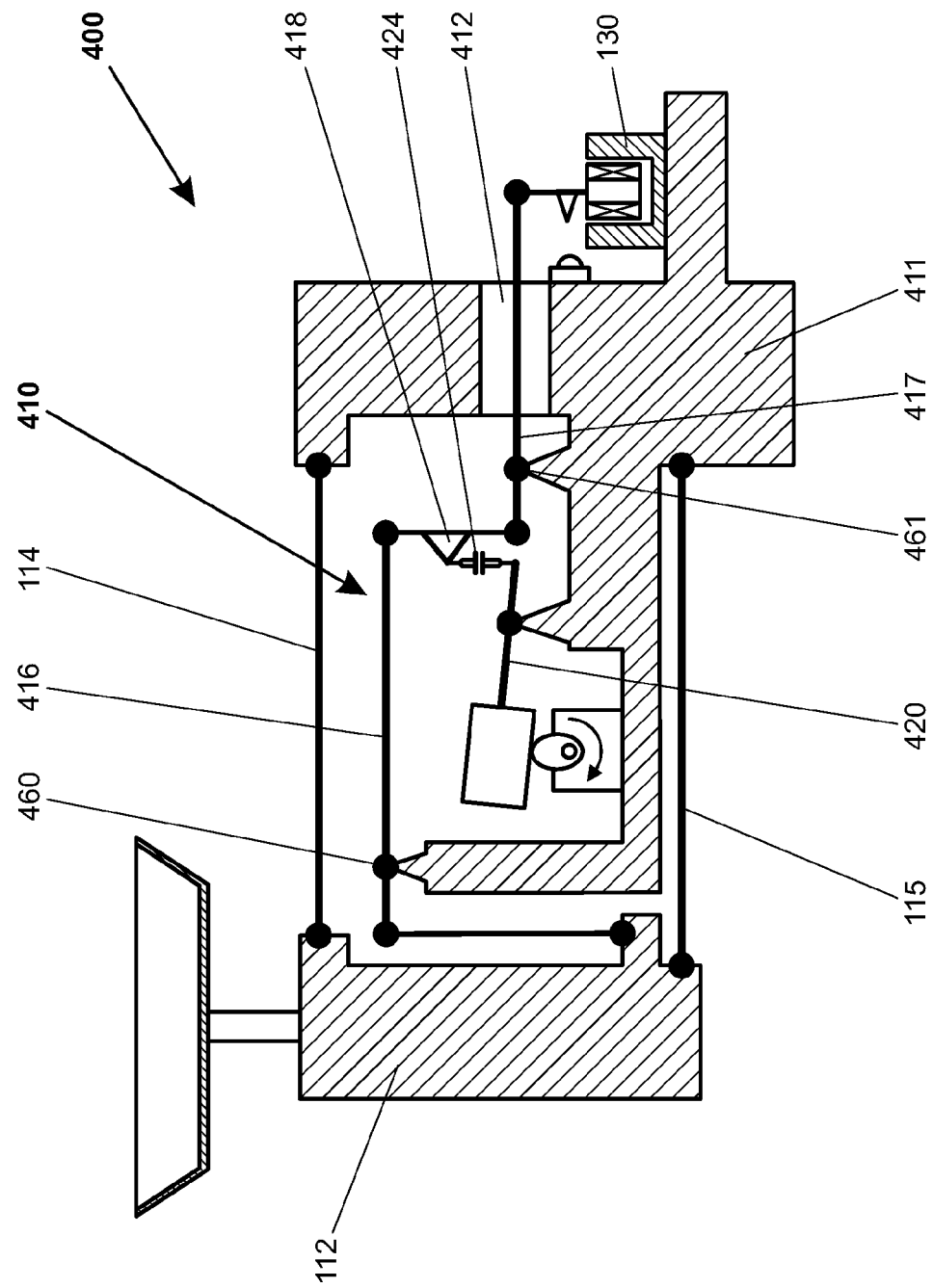
FIG. 4 shows a cross-section representation of a weighing cell with a forth embodiment of the force-transmitting device in side view, with a lever mechanism of two levers arranged between the load-receiving part and the measurement transducer for the reduction of the force acting on the load-receiving part, wherein a unidirectional coupling element capable of transmitting only compressive forces is arranged between a second coupling element of the two levers and the calibration lever.

FIG. 4 shows a side view of a schematic representation of a weighing cell 400 with a fourth embodiment of the force-transmitting device 410 which has a lever mechanism with two levers 416, 417 arranged between the load-receiving part 112 and the measurement transducer 130 for the reduction of the force that is acting on the load-receiving part 112. FIG. 4 likewise contains components that are identical to some of the components in the preceding figures and which therefore carry the same reference symbols or are not described again.

The first lever 416 is force-transmitting linked to the second lever 417 through the coupling element 418. Arranged between the coupling element 418 and a calibration lever 420 that is pivotally mounted on the stationary part 411 is a unidirectional coupling element 424 with the capability to transmit compressive force only. In the illustrated arrangement, the respective lines of action of the forces of the coupling element 418 and of the laterally connected unidirectional coupling element 424 are offset from each other, and as a result a torque is produced which creates a load on the fulcrum pivots 460, 461 of the levers 416, 417. One should therefore aim preferably for solutions in which the two lines of action coincide.

To facilitate the transmission of force to the measurement transducer 130, the stationary part 411 has an opening 412 through which the second lever 417 passes to the outside, so that the measurement transducer 130 can be arranged on the side of the stationary part 411 that faces away from the parallel guides 114, 115.

Figure 5:
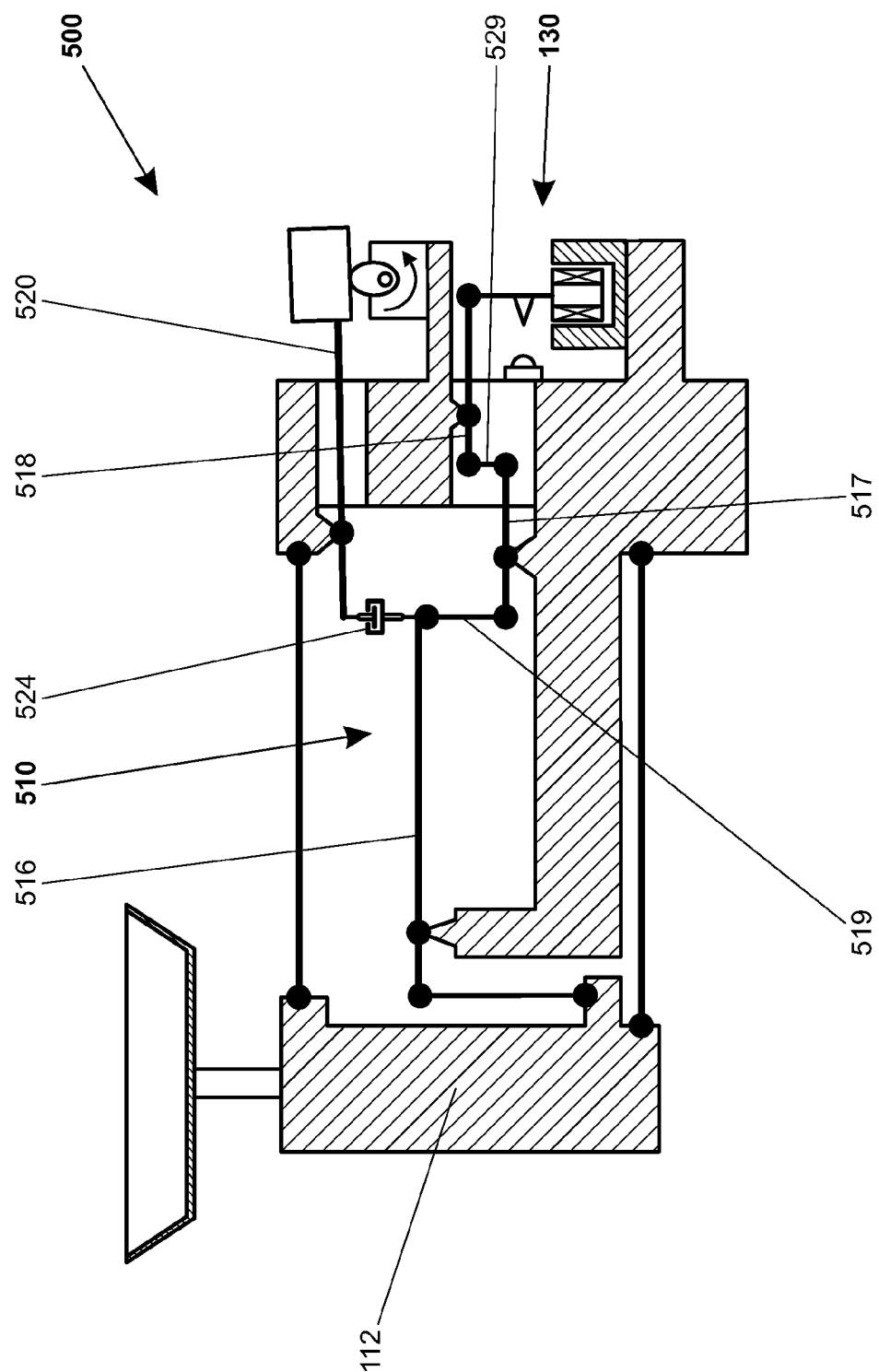
FIG. 5 shows a cross-section representation of a weighing cell with a fifth embodiment of the force-transmitting device in side view, with a lever mechanism of three levers arranged between the load-receiving part and the measurement transducer for the reduction of the force acting on the load-receiving part, wherein a unidirectional coupling element capable of transmitting only tensile forces is arranged between the lever mechanism and the calibration lever.

FIG. 5 shows a schematic representation of a weighing cell 500 with a fifth embodiment of the force-transmitting device 510 in a side view. The force-transmitting device 510 has a lever mechanism with three levers 516, 517, 518 arranged between the load-receiving part 112 and the measurement transducer 130 for the reduction of the force that is acting on the load-receiving part 112. As illustrated in FIG. 4 and described above, the first lever 516 is force-transmitting linked through a second coupling element 519 to the second lever 517 which, in turn, is force-transmitting linked through a third coupling element 529 to the third lever 518. A unidirectional coupling element 524 which is only capable of transmitting tensile forces is arranged between the lever mechanism and a calibration lever 520. The introduction of the calibration force occurs at the second coupling element 519 which connects the first lever 516 to the second lever 517. In contrast to FIG. 4, the unidirectional coupling element 524 is not arranged with a parallel offset from the second coupling element 519, but is in line with the latter. This in-line arrangement avoids the possibility of introducing a torque into the second coupling element 519 during the calibration process, a problem which can occur with the second coupling element 419 shown in FIG. 4.

Figure 6:
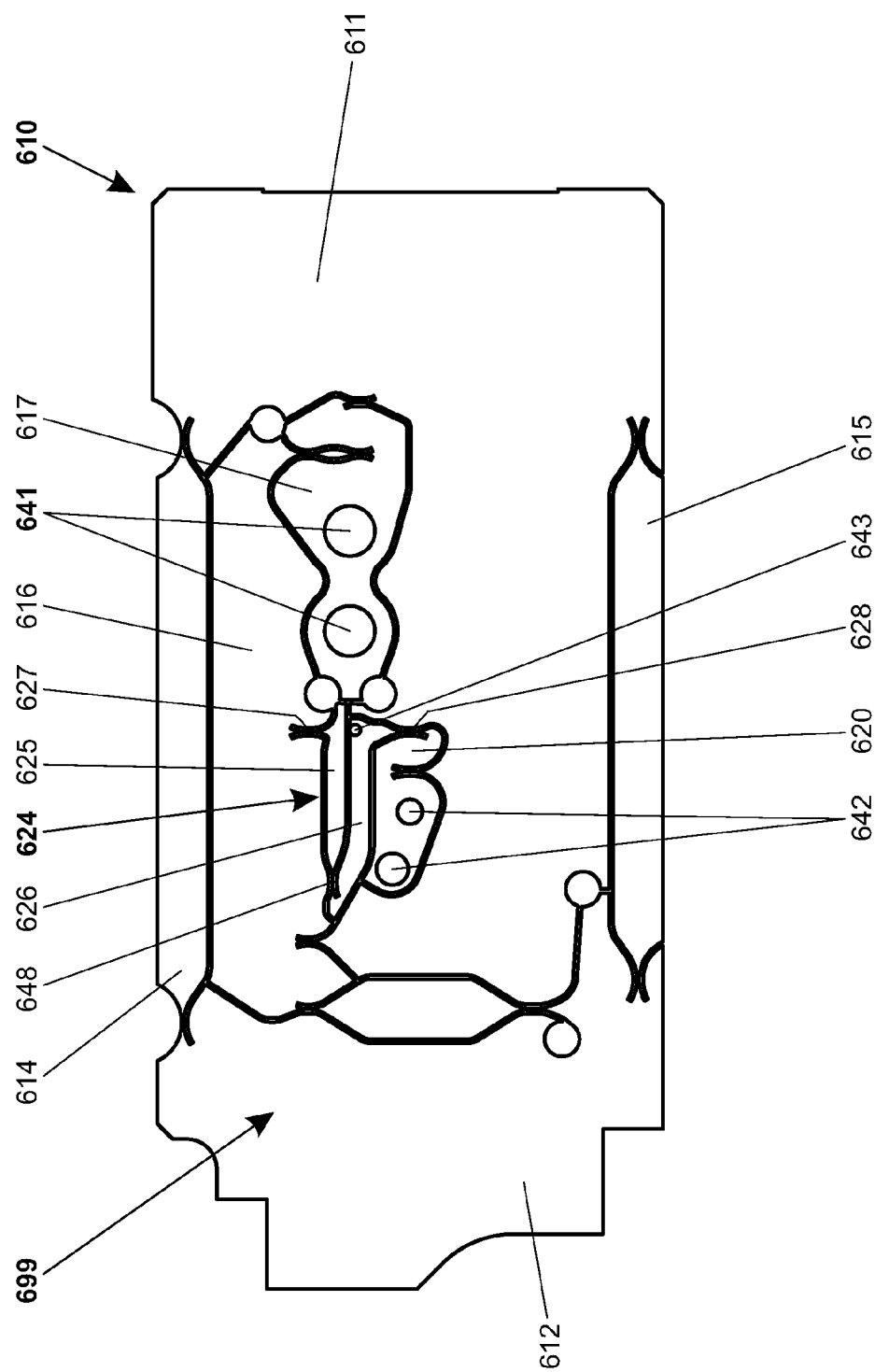
FIG. 6 shows a cross-section of a monolithically designed force-transmitting device in side view, wherein a lever mechanism, a coil lever, a calibration lever, coupling elements connecting the levers, as well as a parallel-guiding linkage are formed by means of narrow linear cuts, and wherein the unidirectional coupling element arranged between the lever mechanism and the calibration lever has two coupling element parts which are connected to each other through a flexible hinge.

In FIG. 6 a monolithically formed force-transmitting device 610 is shown in a side view. A material block 699 which is delimited by its profile contours is traversed by narrow linear cuts passing through the material block 699 at a right angle to the plane of the drawing so as to form a first lever 616, a second lever 617, a calibration lever 620, a first parallel guide 614, a second parallel guide 615, the stationary part 611, the load-receiving part 612 as well as a first coupling element and a second coupling element. All of these parts which are formed by means of linear cuts are appropriately connected to each other by flexure pivots that are likewise produced through linear cuts, so that the force-transmitting device 610 essentially has a load-receiving part 612 linked to the stationary part 611 for guided movement, a lever mechanism 616, 617, as well as a calibration lever 620. The second lever is connected by means of a lever arm extension (not shown in the drawing) to the measurement transducer (likewise not shown). Two holes 641 in the second lever serve for the attachment of the lever arm extension. The calibration lever also has two holes to which a calibration weight can be fastened. Arranged between the first lever 616 and the calibration lever 620 is a unidirectional coupling element 624 which has two coupling element parts 625, 626 connected to each other by means of a flexible hinge 648. Although the two coupling element parts 625, 626 are physically connected to each other, the unidirectional coupling element 624 is nevertheless considered to be divided into two parts in accordance with the disclosed embodiments. The opening direction of the flexible hinge 648 is oriented to correspond to the central longitudinal axis of the first and second flexure pivots 627, 628. For the transmission of compressive forces, a projection 643 is formed on the first coupling element part 625 and a contact surface oriented to cooperate with the projection is formed on the second coupling element part 626.

Figure 7:
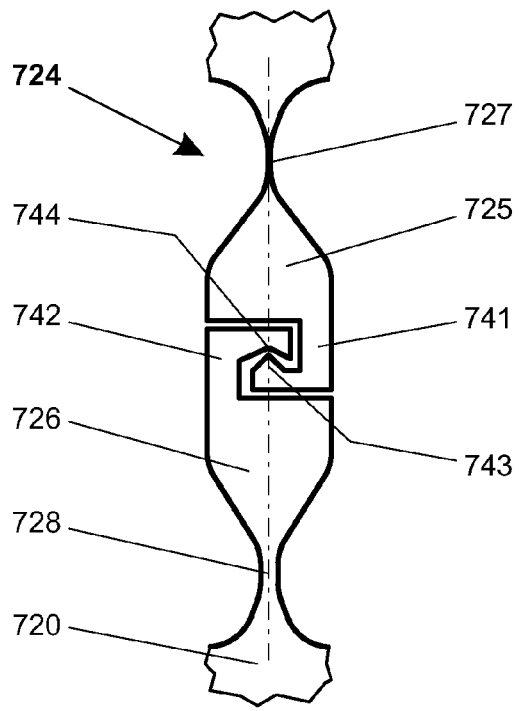
FIG. 7 shows an embodiment of a unidirectional coupling element that is capable of transmitting only a tensile force.

FIG. 7 illustrates an embodiment of a unidirectional coupling element 724 in its operating position, which can transmit only a tensile force. A first coupling element part 725 is connected by means of a first flexure pivot 727 to the load-receiving part or the lever mechanism of a force-transmitting device (indicated in fragmentary fashion). Due to the hanging position of the first coupling element part 725, the first flexure pivot 727 can have a very slender shape. The first coupling element part 725 further includes a first traction element 741.

The second coupling element part 726 is connected through a second flexure pivot 728 to the calibration lever 720 (indicated in fragmentary fashion). The second flexure pivot 728, which remains in an upstanding orientation, needs to have a stiffer spring constant. Accordingly, it needs to be given a sturdier design than the first flexure pivot 727. If its design is sufficiently well matched to the operating conditions of the force-transmitting device, the second coupling element part 726 will not be deflected sideways due to the force of gravity or due to forces caused by inertia and acceleration.

The second coupling element part 726 includes a second traction element 742. As soon as a force needs to be transmitted from the second flexure pivot 728 to the first flexure pivot 727, the first traction element 741 moves into force-transmitting engagement with the second traction element 742 after a short displacement of the two traction elements relative to each other. For an even more reliable transmission of tensile forces, the first traction element 741 can have a projection 743, and the second traction element 742 can have a V-shaped bearing 744. As soon as the first traction element 741 and the second traction element 742 are engaged in each other, the projection 743 and the V-bearing 744, as a result of their shapes, are in self-centering alignment with each other and the projection 743 is seated in the V-bearing 744.

Figure 8:
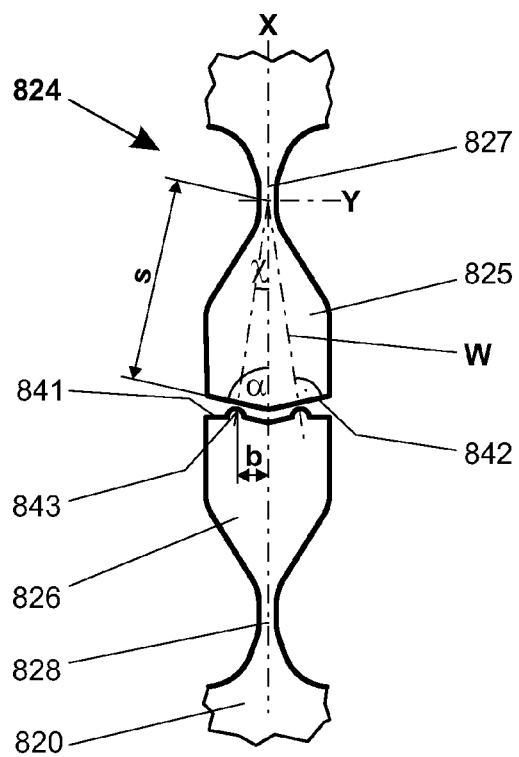
FIG. 8 shows an embodiment of a unidirectional coupling element that is capable of transmitting only a compressive force.

FIG. 8 illustrates a possible design of a unidirectional coupling element 824 in its operating position, which can transmit only a compressive force. A first coupling element part 825 is connected by means of a first flexure pivot 827 to the load-receiving part or the lever mechanism of a force-transmitting device (indicated in fragmentary fashion).

A second coupling element part 826 is connected through a second flexure pivot 828 to the calibration lever 820 (indicated in fragmentary fashion). Since the forces transmitted during the calibration process are compressive forces and the two coupling element parts 825, 826 must be absolutely prevented from buckling and breaking away sideways under a load, the unidirectional coupling element 824 needs to have intrinsic stability. The second coupling element part 826 has a surface 841 facing towards the first coupling element part 825, with projections 843 protruding from the surface 841 which are arranged mirror-symmetrically relative to the central longitudinal axis X of the second flexure pivot 828. Furthermore, the first coupling element part 825 has receiving surfaces 842 facing towards the coupling element part 826 so that one of the projections 843 can seat itself on each of the receiving surfaces 842. With this configuration, two contact points arranged in a plane that extends orthogonal to the central longitudinal axes X of the two flexure pivots 827, 828 are lending an intrinsic stability to the unidirectional coupling element 824, enabling the latter to transmit a compressive force.

As shown in FIG. 8, this arrangement allows the first coupling element part 825 and the second coupling element part 826 to be aligned with each other in the calibration process. As a result, displacements perpendicular to the central longitudinal axes X of the flexure pivots 827, 828 can be prevented. To perform this alignment function, the receiving surfaces 842 on the first coupling element part 825 are slanted at a shallow angle relative to each other. However, the slope angle of the receiving surfaces 842 is subject to certain limits due to the requirement for intrinsic stability of the unidirectional coupling element 824.

These limits depend on the geometric proportions of the unidirectional coupling element 824, wherein the factor to be considered is the angle α between a receiving surface 842 and the central longitudinal axis X of the flexure pivot 827. In the following relationships, b stands for the perpendicular distance of a contact point, more specifically a projection 843, from the central longitudinal axis of the flexure pivot and s stands for the distance of a contact point, more specifically of a receiving surface 842, from the bending axis Y of the first flexure pivot 827.

$$X = \arcsin(b/s)$$

$$\alpha = (90° - X) = \arccos(b/s)$$

The angle α has to satisfy the condition:

$$90° \geq \alpha \geq \arccos(b/s)$$

According to the foregoing definition of the angle α, intrinsic stability is attained if the lines of action W of the forces transmitted at the contact points are not intersecting within the first coupling element part 825. The borderline case where α=arccos(b/s) is shown in FIG. 8.

Although the disclosed embodiments have been described through the presentation of specific embodiments, it is evident that numerous further variant solutions could be created based on knowledge gained from the disclosed embodiments, for example by combining the features of the individual embodiments with each other and/or by interchanging individual functional units of the exemplary embodiments. Among other possibilities, one could consider alternative embodiments in which several calibration weights can be coupled independently of each other to a lever mechanism either at the same location or at different locations by means of unidirectional coupling elements as proposed by the disclosed embodiments. This makes it possible for example to expand the weighing range of a balance to almost any desired extent. Of course, the possible alternatives also include unidirectional coupling elements that are split vertically into two or more segments, calibration levers and calibration weights, which are operable independently of each other. The scope of possibilities also includes designs where the calibration lever and the calibration weight are monolithically combined with each other.

Further benefits of the device according to the disclosed embodiments are due to the fact that by varying the calibration lever arm lengths it is possible to cover different load ranges with the same physical components, if the calibration weight can be mounted selectively at different fulcrum distances on the calibration lever arm. It is also possible to arrange an adjustment screw between the calibration weight and the calibration lever, serving to precisely set the distance between the calibration weight and the fulcrum point of the calibration lever. This allows the calibration force to be adjusted by precisely shifting the position of the weight, so that in spite of variations caused by manufacturing tolerances and inhomogeneous materials, the calibration force will be the same from one calibration device to another.

Having shown and described an embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. A force-transmitting device for use in a gravimetric measuring instrument, the device comprising:
   a stationary part;
   a measurement transducer arranged on the stationary part;
   a load-receiving part, linked for force transmission to the measurement transducer, directly or indirectly through an intermediate part;
   a calibration weight;
   a calibration lever, with a fulcrum that is based on the stationary arm, the fulcrum dividing the calibration lever into first and second calibration lever arms; and
   a unidirectional coupling element, comprising:
      a first coupling element part, connected through a first flexure pivot to a fixed place on one of: the load-receiving part and the intermediate part; and
      a second coupling element part, connected through a second flexure pivot to a fixed place on the second calibration lever arm,
      the respective coupling elements aligned with each other so that a force from the calibration weight, which is solidly connected to the first calibration arm, is transmitted from the second flexure pivot to the first flexure pivot, the force transmitted being exclusively tensile or exclusively compressive.

2. The force transmitting device of claim 1, further comprising:
   a pair of facing surfaces, one facing surface on each of the respective coupling element parts, the first facing surface comprising two projections that protrude therefrom, the two projections arranged mirror-symmetrically relative to a central longitudinal axis of the flexure pivot associated with the coupling element part on which the projections are located, and the second facing surface comprising two receiving surfaces that are arranged mirror-symmetrically relative to a central longitudinal axis of the flexure pivot associated with the coupling element part on which the receiving surfaces are located, such that the receiving surfaces encloses, between the receiving surface and the central longitudinal axis, an angle a that satisfies the condition:
   $90° \geq \alpha \geq \arccos(b/s)$, where b is a perpendicular distance of the projections from the central longitudinal axis and where s is a distance of the receiving surfaces from a bending axis of the flexure pivot associated with the coupling element part on which the receiving surfaces are located.

3. A gravimetric measuring instrument comprising:
   a force-transmitting device according to claim 1.

4. The device according to claim 1, wherein:
   the load-receiving part, the stationary part, the calibration lever and the unidirectional coupling element are adapted to form a monolithic unit.

5. The device according to claim 1, further comprising:
   an upper parallel guide; and
   a lower parallel guide;
   the parallel guides link the load-receiving part to the stationary part and guide the load-receiving part in vertical movement when the force-transmitting device is in operating position.

6. The device according to claim 5, wherein:
   the load-receiving part, the stationary part, the calibration lever and the unidirectional coupling element are adapted to form a monolithic unit.

7. The device according to claim 1, wherein:
   the second coupling element part comprises a surface which faces towards the first coupling element part, the surface comprises two projections that protrude from the surface and are arranged mirror-symmetrically relative to a central longitudinal axis of the second flexure pivot; and
   the first coupling element part further comprises two receiving surfaces facing towards the second coupling element part, which are arranged mirror-symmetrically relative to the central longitudinal axis of the first flexure pivot.

8. The device according to claim 7, wherein the angle $\alpha$ enclosed between each of the receiving surfaces and the central longitudinal axis satisfies the condition: $90° \geq \alpha \geq \arccos(b/s)$.

9. The device according to claim 8, further comprising:
   an upper parallel guide; and
   a lower parallel guide;
   the parallel guides link the load-receiving part to the stationary part and guide the load-receiving part in vertical movement when the force-transmitting device is in operating position.

10. The device according to claim 9, wherein:
    the load-receiving part, the stationary part, the calibration lever and the unidirectional coupling element are adapted to form a monolithic unit.

11. The device according to claim 1, wherein:
    the first coupling element part comprises a first traction element with a projection;
    the second coupling element part comprises a second traction element with a V-shaped bearing;
    wherein the first coupling element part and the second coupling element part are hooked into each other, the projection is aligned with the V-shaped bearing and, the projection is in force-transmitting contact with the V-shaped bearing when tensile forces are applied to the unidirectional coupling element.

12. The device according to claim 11, further comprising:
    an upper parallel guide; and
    a lower parallel guide;
    the parallel guides link the load-receiving part to the stationary part and guide the load-receiving part in vertical movement when the force-transmitting device is in operating position.

13. The device according to claim 12, wherein:
    the load-receiving part, the stationary part, the calibration lever and the unidirectional coupling element are adapted to form a monolithic unit.

14. The device according to claim 1, wherein:
    the first coupling element part and the second coupling element part are connected to each other by means of a flexible hinge, the opening direction of the flexible hinge is arranged in accordance with the central longitudinal axis of the first and second flexure pivots;

the first coupling element part comprises a projection; and the second coupling element part comprises a contact surface, oriented to cooperate with the projection.

15. The device according to claim 14, further comprising:

an upper parallel guide; and a lower parallel guide;

the parallel guides link the load-receiving part to the stationary part and guide the load-receiving part in vertical movement when the force-transmitting device is in operating position.

16. The device according to claim 15, wherein:

the load-receiving part, the stationary part, the calibration lever and the unidirectional coupling element are adapted to form a monolithic unit.

17. The gravimetric measuring instrument according to claim 3, wherein:

the force-transmitting device is arranged so that the weight force of the calibration weight is transmitted to the measurement transducer in the same direction as a force acting on the load-receiving part.

18. The gravimetric measuring instrument according to claim 3, wherein:

the force-transmitting device is arranged so that the weight force of the calibration weight is transmitted to the measurement transducer in the opposite direction compared to a force acting on the load-receiving part.

19. The gravimetric measuring instrument according to claim 3 wherein:

the calibration weight is made of a corrosion-resistant material with a density of $\rho = 8.0 \text{ kg/dm}^3$.

* * * * *